(12) United States Patent
Baets et al.

(10) Patent No.: US 9,874,701 B2
(45) Date of Patent: Jan. 23, 2018

(54) ADIABATIC COUPLER

(71) Applicants: UNIVERSITEIT GENT, Ghent (BE); IMEC VZW, Leuven (BE)

(72) Inventors: Roeland Baets, Deinze (BE); Stijn Vandewiele, Ledeberg (BE); Danaë Delbeke, Gentbrugge (BE); Dries Vanthourhout, Ghent (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 0 days.

(21) Appl. No.: 15/106,428

(22) PCT Filed: Dec. 21, 2014

(86) PCT No.: PCT/EP2014/078938
§ 371 (c)(1),
(2) Date: Jun. 20, 2016

(87) PCT Pub. No.: WO2015/092064
PCT Pub. Date: Jun. 25, 2015

(65) Prior Publication Data
US 2017/0003454 A1 Jan. 5, 2017

(30) Foreign Application Priority Data

Dec. 20, 2013 (EP) .................................... 13199259

(51) Int. Cl.
*G02B 6/10* (2006.01)
*G02B 6/35* (2006.01)
*G02B 6/12* (2006.01)

(52) U.S. Cl.
CPC ......... *G02B 6/3538* (2013.01); *G02B 6/3536* (2013.01); *G02B 6/3568* (2013.01); *G02B 6/3596* (2013.01); *G02B 2006/12145* (2013.01)

(58) Field of Classification Search
USPC ...................................................... 385/14–24
See application file for complete search history.

(56) References Cited

U.S. PATENT DOCUMENTS 7,283,696 B2* 10/2007 Ticknor ............... B01F 13/0076
                                                         385/129
2003/0012483 A1* 1/2003 Ticknor ............... G02B 26/005
                                                         385/16
(Continued)

FOREIGN PATENT DOCUMENTS

GB          2207522 A        2/1989

OTHER PUBLICATIONS

Chan et al., "A Wide-Angle X-Junction Polymeric Thermooptic Digital Switch With Low Crosstalk," IEEE Photonics Technology Letters, Sep. 2003, pp. 1210-1212, vol. 15, No. 9.
(Continued)

*Primary Examiner* — Eric Wong
(74) *Attorney, Agent, or Firm* — Workman Nydegger

(57) ABSTRACT

A system for selectively adiabatically coupling electromagnetic waves from one waveguide to another waveguide is described. It comprises a first waveguide portion and a second waveguide portion having substantially different surface normal cross-sections. Portions thereof are positioned with respect to each other in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur. The system also comprises a fluid positioning means for selectively positioning at least a first fluid simultaneously overlaying both said first waveguide portion and said second waveguide portion in the coupling region thus
(Continued)

selectively inducing first predetermined environmental conditions or second predetermined environmental conditions.

15 Claims, 8 Drawing Sheets

(56) References Cited

U.S. PATENT DOCUMENTS

| | | |
|---|---|---|
| 2010/0247037 A1 | 9/2010 | Little |
| 2011/0053095 A1 | 3/2011 | Sakuma et al. |
| 2016/0131842 A1* | 5/2016 | Mahgerefteh .......... G02B 6/124 |
| | | 385/11 |

OTHER PUBLICATIONS

Extended European Search Report for corresponding European Application No. 13199259.6, dated May 21, 2014.
Hsiao, "Active Integrated Optic Devices for Sensing: Optical Rate Gyroscopes and Stellar Interferometers," PhD Thesis, University of Michigan, 2010, pp. 1-173.
International Search Report for corresponding International PCT Application No. PCT/EP2014/078938, dated Mar. 10, 2015.
Ishikawa, "Fully Adiabatic Design of Waveguide Branches," Journal of Lightwave Technology, Jul. 2007, pp. 1832-1840, vol. 25, No. 7.

* cited by examiner

ADIABATIC COUPLER

FIELD OF THE INVENTION

The invention relates to the field of optical devices. More specifically it relates to methods and systems for efficiently switching electromagnetic waves between waveguides as well as to methods for manufacturing such switching systems.

BACKGROUND OF THE INVENTION

Different working mechanisms exist for Photonic Integrated Circuit (PIC) or Planar Lightwave Circuit (PLC) optical switches. These include beam-steering, interference systems, such as directional couplers, and adiabatic systems, such as adiabatic couplers.

Beam-steering mechanisms have a limited scalability, are usually mechanically instable (sensitive to vibrations) and the losses are too high.

Interference based switches are strongly wavelength dependent. Due to the interference nature of this system, the conditions of cross and bar state strongly depend on wavelength, coupling coefficient (and thus fabrication tolerance on gap size and temperature) and effective index difference of the waveguides (and therefore on wavelength and fabrication tolerance of the width (and sensitivity on cladding index)).

This large sensitivity results in larger losses for a fabrication-design mismatch and wavelength-sensitivity which makes the design infeasible for different types of applications, e.g. applications that need a large operational bandwidth.

A third family of switches is based on adiabatic coupling or mode evolution coupling. Herein, as opposed to directional couplers, the goal is to keep the optical power always in one mode, i.e. the locally orthogonal mode (even in the transition from constituent modes to super modes) while the exact field-profile of the coupled modes changes over propagation distance. Light in mode 1 will remain in mode 1 while light in mode 2 remains in that same mode, but not necessarily in the same waveguide. No interfering optical parts are needed which therefore results in a switching mechanism which is not inherently sensitive to wavelength, temperature and fabrication. This is beneficial for the operational bandwidth of the switch and results in a lower sensitivity to manufacturing variability.

In U.S. Pat. No. 7,283,696 a directional coupler for switching is disclosed wherein a micro channel, formed in the substrate, is positioned in proximity of the core of a waveguide such that an amount of optical power extends into the portion of the micro channel in close proximity of the waveguide core and wherein a liquid can circulate in the micro channel. The micro channel is accurately (micrometer to sub-micrometer accuracy) aligned with the waveguides in the substrate. It is known by a person-skilled-in the art that the fabrication process to align fluidic channels with waveguides is a non-trivial manufacturing step.

SUMMARY OF THE INVENTION

It is an object of the present invention to provide good electromagnetic wave switches as well as methods for switching electromagnetic wave.

It is an advantage of embodiments of the present invention that methods and systems are provided for efficiently coupling electromagnetic waves between waveguides.

It is an advantage of embodiments of the current invention that a difference between the interaction of the first waveguide and the second waveguide with a fluid and the controlling of the position of the fluid enables to change from one state to the other, while it is not necessary to align the liquids with the waveguides. It is an advantage of embodiments of the present invention that the liquids do not need to be aligned with the waveguides because, as a consequence, this increases the manufacturability of the system. In particular, as in the region where coupling occurs, waveguides are positioned really close to each other, the alignment of a microfluidic channel that needs to cover one waveguide and does not cover the other waveguide is stringent. If this can be avoided, switches are far less subject to manufacturing variability.

It is an advantage of embodiments of the present invention that manufacturable bistable adiabatic couplers are provided.

It is an advantage of embodiments of the present invention that the coupling loss is less than the coupling loss of prior art solutions coupling light from one waveguide or one optical mode to another waveguide or optical mode. This is important in applications for which low losses are essential, for example in view of upscaling.

It is an advantage of embodiments of the present invention that they enable bistable coupling.

The operational wavelength range of adiabatic couplers is known to be very large. It is an advantage of embodiments of the present invention, that the wavelength range is broad compared to other optical coupling technologies.

Although not limited thereto, it is an advantage of embodiments of the present invention that the systems can be made using a silicon platform, such as silicon on insulator (SOI) or silicon nitride (SiN). It is an advantage of these material systems that they possess unique optical properties that allow the creation of very compact and high density optical circuits. Moreover, these optical circuits can be fabricated on a wafer scale using existing CMOS (complementary metal oxide semiconductor) processing infrastructure. CMOS is the dominant technology for the fabrication of digital electronic integrated circuits. This brings the same advantages that propelled the success of CMOS electronics to photonics: increase of performance and reliability, the possibility of creating compact components with complex functionality and a spectacular decrease of the cost per function by making use of high yield, wafer scale processes.

It is an advantage of embodiments of the present invention that a high refractive index contrast silicon or silicon nitride platform in comparison with the lower refractive index contrast glass-type and polymer type planar waveguide technologies allows to have small size individual switches.

The above objective is accomplished by a method and device according to the present invention.

The present invention relates to a system for selectively adiabatically coupling electromagnetic waves from one waveguide to another waveguide, the system comprising:

a first waveguide portion and a second waveguide portion, the first waveguide portion and the second waveguide portion having a substantially different surface normal cross-section causing a different interaction between the first and second waveguides and the environment, and the first waveguide portion and the second waveguide portion being positioned with respect to each other in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur, and a fluid positioning means for selectively positioning at least a first fluid simultaneously overlaying both said first waveguide portion and said second waveguide portion in the coupling region thus selectively inducing first predetermined environmental conditions or not overlaying both said first waveguide portion and said second waveguide portion in the coupling region thus inducing second predetermined environmental conditions.

Where in embodiments according to the present invention reference is made to a different surface normal cross-section of the waveguide portions, reference is made to a different geometry e.g. size or a different shape (more broad, more narrow, having a differently shaped cross-section, etc.) of the waveguide portions, a different type or shape of cladding material, a different distance to the overlaying fluid, e.g. due to a vertical stacking of the waveguide portions, etc.

It is an advantage of embodiments of the present invention that a switch can be made for adiabatic coupling that suffers little or not from manufacturing variability. It is an advantage of embodiments of the present invention that a switch for adiabatic coupling can be provided that has a good controllability and thus good accuracy for switching actions.

The fluid positioning means for selectively position a first fluid may comprise a first fluid having a first refractive index and a second fluid having a second refractive index, different from the first refractive index, and the fluid positioning means may be adapted for replacing the first fluid by the second fluid in the coupling region.

It is an advantage of some embodiments that more than one or even more than two fluids are used, e.g. for tuning the coupling. For example, in one embodiment a first fluid is used for inducing no coupling, a second fluid is used for obtaining partial coupling and a third fluid is used for obtaining full coupling.

The fluid positioning means may comprise a microfluidic channel or compartment and is adapted for moving at least the first fluid therein. It is an advantage of embodiments of the present invention that known technology for introducing microfluidic channels can be used for implementing the switch, resulting in a relatively easy manufacturing technique for the switch.

The microfluidic channel or compartment overlays the coupling region. It is an advantage of embodiments of the present invention that there is no need for overlap by the microfluidic channel of one waveguide, while the other waveguide is to be kept free from overlap. By avoiding this, the manufacturing accuracy required for outlining the microfluidic channel with respect to the waveguides can be far lower.

The cross-section of the first waveguide in the coupling region has a different shape than the cross-section of the second waveguide in the coupling region. It is an advantage of embodiments of the present invention that due to a different shape of the cross-section, a different interaction of the waveguides with the fluid is obtained, resulting in the possibility that the switch changes from bar state to cross state when changing the liquid covering both waveguides. It is an advantage of embodiments of the present invention that the effective refractive index of the first waveguide changes differently than the effective reactive index of the second waveguide, due to the difference in interaction between the waveguides and the fluid.

The distance between the core of the waveguide and the first fluid may be different for the second waveguide compared to the first waveguide.

The first waveguide may comprise a cladding in the coupling region whereas the second waveguide does not comprise a cladding in the coupling region. It is an advantage of embodiments of the current invention that due to a difference in presence of the cladding, the system changes from bar state to cross state when changing the liquid covering both waveguides.

A cladding of the first waveguide and a cladding of the second waveguide may be different in size and/or geometry. It is an advantage of embodiments of the current invention that due to a difference in cladding, the influence of the environmental conditions is different on both waveguides and the system can be configured as a switch for changing from bar state to cross state when changing the fluid covering of both waveguides.

A cladding of the first waveguide and a cladding of the second waveguide may be made of different materials.

The first and second waveguide may be stacked vertically and liquid is filling cavity in between waveguides.

The first and second waveguide may be stacked vertically and liquid is surrounding at least partially at least one of the waveguides. Where in embodiments according to the present invention reference is made to vertically stacked waveguides, reference is made to waveguides that are stacked up on each other with reference to the substrate. In other words, the waveguides are positioned on or in the substrate, the waveguides are stacked on each other and one of the waveguides is positioned further away from the bottom of the substrate than the other waveguide. It is an advantage of embodiments of the current invention that for a system with the first and second waveguide positioned in a vertical stack and with a difference in cross-section between them, the system changes from bar state to cross state when changing the fluid in the cavity surrounding both waveguides.

The first fluid may have a high refractive index and the second liquid may have a low refractive index.

The first fluid and the second fluid may be immiscible.

The fluids may be moveable through any of electro wetting on dielectric, pumping, or electrophoresis.

The first waveguide and the second waveguide may be positioned horizontally aside each other. Where in embodiments according to the present invention reference is made to waveguides or waveguide portions being positioned horizontally aside each other, reference is made to waveguides being positioned aside each other up or in the substrate.

The system may be implemented based on a silicon platform.

The present invention also relates to a method for selectively adiabatically coupling electromagnetic waves from a first waveguide to a second waveguide, the method comprising selectively positioning a first fluid simultaneously overlaying both a waveguide portion of the first waveguide and a waveguide portion of the second waveguide portion in a coupling region where the waveguide portions have a substantially different surface normal cross-section and are positioned so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur, the selectively positioning being such to selectively inducing first predetermined environmental conditions or second predetermined environmental conditions.

The present invention also relates to a method of manufacturing a system for selectively adiabatically coupling electromagnetic waves from a first waveguide to a second waveguide, the method comprising providing a fluid positioning means for selectively positioning a first fluid simultaneously overlaying both said first waveguide portion and said second waveguide portion in the coupling region thus selectively inducing first predetermined environmental conditions or for not overlaying both said first waveguide portion and said second waveguide portion in the coupling region thus inducing second predetermined environmental conditions.

providing a first waveguide portion and a second waveguide portion, the first waveguide portion and the second waveguide portion having a substantially different surface normal cross-section causing a different interaction of the first and second waveguides with the environment and being positioned in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur, and—providing a fluid positioning means for selectively positioning a first fluid simultaneously overlaying both said first waveguide portion and said second waveguide portion in the coupling region thus selectively inducing first predetermined environmental conditions or for not overlaying both said first waveguide portion and said second waveguide portion in the coupling region thus inducing second predetermined environmental conditions.

Providing said waveguides may comprise using CMOS processing techniques.

Providing said waveguides may comprise providing a cladding material on one waveguide, while providing no cladding material on the other waveguide. Alternatively, also applying a different cladding material thickness for both waveguide portions may be performed.

The present invention also relates to a system for selectively adiabatically coupling electromagnetic waves from one waveguide to another waveguide, the system comprising a first waveguide portion and a second waveguide portion, the first waveguide portion and the second waveguide portion being stacked vertically on top of each other and being positioned with respect to each other in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur, and a fluid positioning means for selectively positioning a first fluid (110) with respect to said first waveguide portion and said second waveguide portion in the coupling region for selectively inducing first predetermined environmental conditions or second predetermined environmental conditions.

It is an advantage of embodiments of the present invention that CMOS processing of a stacked set of waveguides can be easily performed.

Aspects of the above mentioned embodiments can mutatis mutandis also be aspects of the present embodiments.

The fluid positioning means may be a microfluidic channel or microfluidic compartment overlaying the coupling region.

The surface normal cross-section of the first waveguide may be different than that of the second waveguide in the coupling region.

The fluid providing means may be adapted for providing fluid in channels aside the waveguide portions. Such channels may be easily manufacturable using CMOS processing.

The fluid positioning means may in some embodiments switch between bringing a fluid in overlay with one waveguide and not with another on the one hand and bringing the fluid not in overlay with any waveguide on the other hand, or between both waveguides being simultaneously overlayed with the fluid on the one hand and none of the waveguides being overlayed with fluids on the other hand, or between the first waveguide being overlayed with fluid and the second waveguide not being overlayed on the one hand and the second waveguide being overlayed while the first waveguide is not overlayed on the other hand.

The present invention also relates to a method of manufacturing a system for selectively adiabatically coupling electromagnetic waves from a first waveguide to a second waveguide, the method comprising providing a first waveguide portion and a second waveguide portion, the first waveguide portion and the second waveguide portion being stacked upon another and positioned close to each other in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur, and providing a fluid positioning means for selectively positioning a first fluid with respect to the first waveguide portion and said second waveguide portion in the coupling region thus selectively inducing first predetermined environmental conditions or second predetermined environmental conditions.

Providing the first waveguide portion and the second waveguide portion may comprise providing microfluidic channels around the waveguides using CMOS processing techniques.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
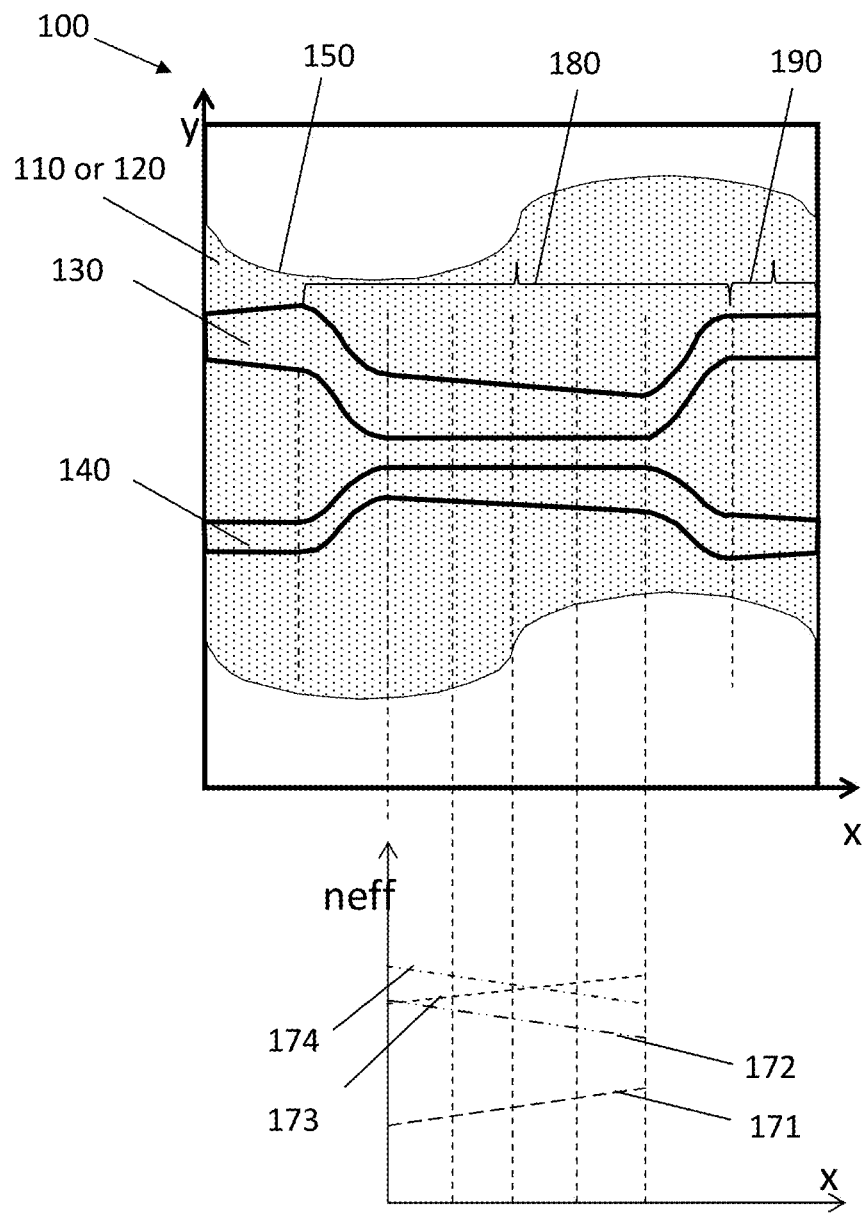
FIG. 1 illustrates a top view of a system according to an embodiment of the present invention and a graph with corresponding effective refractive indexes.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "a state of the system", reference can be made to either one of the following two states: a cross state or a bar state. In the cross state the fundamental modes in the respective waveguides cross, or in other words coupling is obtained, while in the bar state they don't. In some embodiments, the cross state also may refer to the fact that one fundamental mode is coupled to the other waveguide and in the bar state that mode is not coupled.

Where in embodiments of the present invention reference is made to "the x-axis" reference is made to an axis along the propagation direction of the light in the waveguides.

Where in embodiments of the present invention reference is made to the surface normal cross-section of a waveguide or a waveguide portion, reference is made to the cross-section in a direction perpendicular to the average propagation direction (i.e. the travelling direction). The surface normal cross-section of a waveguide or waveguide portion thereby refers to all aspects of the waveguide in that cross-section, encompassing the geometry, size and material type of the core as well as the geometry, size and material type of cladding material or material functioning as cladding for the waveguide.

Where in embodiments of the present invention reference is made to a difference in the surface normal cross-section for two waveguides or waveguide portions, reference thus is made to any different aspect in the cross-section, e.g. a difference in the geometry, size and material type of the core and/or the geometry, size and material type of cladding material or material functioning as cladding for the waveguide.

Where in embodiments of the present invention reference is made to a fluid positioning means, reference is made to a system or component configured for influencing a position of a fluid. Examples of such systems may be a fluidic channel or compartment where fluid can be displaced using a pumping system, a fluidic channel or compartment where fluid can be displaced using electrophoresis, the fluid positioning system than being a system configured for performing electrophoresis, a fluidic channel or compartment where fluid can be displaced using electrowetting, the fluid positioning system than being an electrowetting device, etc.

The devices and methods of the present invention can—optionally—advantageously make use of a silicon platform or silicon nitride platform material system, also referred to as silicon photonics system. However, the devices and methods of the present invention can be based on other material systems, such as for example III-V material systems, metallic layers, other dielectric layers such as aluminium oxide, chalcogenides, $TiO_2$, etc. or a combination thereof.

The silicon or silicon nitride platform is a very interesting material system for highly integrated photonic circuits. The high refractive index contrast allows photonic waveguides and waveguide components with submicron dimensions to guide, bend and control light on a very small scale so that various functions can be integrated on a chip. This allows a high level of miniaturization, which is advantageous. Furthermore for both waveguide types light can be efficiently coupled in and out the PIC by use of e.g. a grating coupler or another coupling element.

Using a silicon or silicon nitride platform also has some technological advantages. Due to the CMOS industry, silicon technology has reached a level of maturity that outperforms any other plane chip manufacturing technique by several orders of magnitude in terms of performance, reproducibility and throughput. Nano-photonic ICs can be fabricated with wafer scale-processes, which means that a wafer can contain a high amount of photonic integrated circuits. Combined with the commercial availability of large wafers at a relative moderate cost, this means that the price per photonic integrated circuit can be very low.

In a first aspect the current invention relates to a system being an adiabatic switch for selectively coupling electromagnetic waves from one waveguide to another waveguide.

The system according to embodiments of the present invention comprises a first waveguide portion and a second waveguide portion. These waveguide portions typically are part of the respective waveguides between which electromagnetic waves are to be coupled. According to embodiments of the present invention, the first waveguide portion and the second waveguide portion have a substantially different surface normal cross-section. A substantially different surface normal cross-section may be caused by a different cross-sectional shape, a different size, a different material, etc. The cross-section typically may be taken in the surface normal direction. When switching the environment around the first and second waveguide this will result in another effective index change of the respective optical modes in the waveguide.

The first waveguide portion and the second waveguide portion are, according to embodiments of the present invention, positioned with respect to each other in a coupling region so that under first predetermined environmental conditions coupling of radiation between the first waveguide portion and the second waveguide portion can occur and under second predetermined environmental conditions substantially no coupling of electromagnetic waves between the first waveguide portion and the second waveguide portion can occur. As indicated above, coupling of electromagnetic waves may refer to coupling of the fundamental modes of radiation in a waveguide, coupling of one or more specific fundamental modes, etc.

According to embodiments of the present invention, the system also comprises a fluid positioning means for selectively positioning a first fluid simultaneously overlaying both said first waveguide portion and said second waveguide portion in the coupling region thus selectively inducing first predetermined environmental conditions or second predetermined environmental conditions.

By way of illustration, embodiments of the present invention not being limited thereto, standard and optional features of embodiments of the present invention will further be described with reference to an example system as shown in FIG. 1.

FIG. 1 illustrates a top view of an embodiment of the current invention wherein the first liquid 110 or the second liquid 120 is covering both the first and second waveguide 130, 140. In embodiments of the current invention the first and second waveguide have a different surface normal cross-section with regard to the core and/or with regard to the cladding of the respective waveguides. In the exemplary embodiment of FIG. 1 it can be seen that the cross-section of the first waveguide 130 at a certain position along the x-axis is different from the cross-section of the second waveguide 140 at the same position along the x-axis i.e. the cross-section in transversal direction also referred to as the cross-section in surface normal direction of the second waveguide 140. In the embodiment of FIG. 1 the first and/or second liquid 110, 120 is contained in a microfluidic channel, compartment or chamber 150. In the exemplary embodiment of FIG. 1 the first and second waveguide 130, 140 may comprise a core and a cladding. Both the adiabatic coupler 180 as well as the adiabatic taper 190 are illustrated in FIG. 1. An adiabatic taper also may be present at the inside of the device.

The first and second waveguide may be separate from each other by material, by a cavity where fluid can be present or can be directly adjacent to each other.

In the exemplary embodiments of the present invention the waveguides according to embodiments of the present invention are positioned close to each other so that depending on environmental conditions that influence the effective refractive index, coupling between the waveguides is either efficient or inefficient. In embodiments of the present invention, coupling is enabled or not or is enabled in different degrees (e.g. efficient coupling, less efficient coupling, . . . ). Depending on the length of the coupler, the coupling ratio is defined.

According to the example shown in FIG. 1, the environmental conditions are altered by selectively switching between two different types of fluids, whereby each time the same fluid simultaneously covers both the waveguide portions. For providing such a switch, a fluid positioning means is provided. In the present example, the fluid positioning means is adapted for switching between the fluids, in the present case being moving immiscible fluids in a microfluidic channel. E.g. using a pumping means or any other means allowing movement of the fluids for bringing them selectively in overlay above the waveguides in a coupling zone, the fluid can be positioned accurately and the coupling conditions can be switched. Other means that can be envisaged are electrophoresis systems, electrowetting systems, etc.

In each particular state, a particular fluid covers the waveguides simultaneously. In embodiments of the present invention the system 100 is in a first state when e.g. in the OFF state, the first liquid 110 is describing a volume covering both the first and second waveguide 130, 140. In the ON state, the second liquid 120 replaces the first liquid. According to embodiments of the present invention, the fluid positioning means may be a microfluidic channel wherein fluid plugs of the first fluid and the second fluid are present and which can be altered, e.g. by pumping, by applying electrophoresis for moving the fluids, by applying electrowetting for moving the fluids, etc. In other embodiments according to the present invention the fluids may be present as droplets, e.g. in microfluidic or fluidic compartments. In those embodiments the state of the system 100 can be changed by moving the droplet. In still other embodiments, one fluid may be electrically moved by rendering surfaces hydrophilic or hydrophobic.

In embodiments of the present invention, fluid may be a liquid, a gas, a hydrogel or gel or even an object (as can be seen from U.S. Pat. No. 7,283,696). The liquid can also comprise objects.

The coupling conditions can thus be switched and this way coupling can be turned on and off by moving at least one fluid such that the first fluid does not cover the waveguides anymore, but e.g. a second fluid 120 or even a further fluid covers the first and second waveguide 130, 140 (ON state) instead of the first fluid 110 (OFF state) or vice versa. In the present example, where two fluids are used in a microfluidic channel, the difference in refractive index of the two immiscible liquids is selected so as to provide environmental conditions for the waveguides that will impact the propagation constants of the guided light in the underlying integrated optical waveguides as well as the coupling coefficient. Depending on the value of the propagation constants, the light will be guided either to the bar output or to the cross output of the optical 2×2 coupler.

The graph in FIG. 1 shows the effective refractive index $n_{eff}$ in function of the x-axis along the propagation direction of the light. Both the bar status of the switch when low-index liquid is on top of the coupler (curves 171, 172) and the cross status when high-index liquid is on top of coupler (curves 173, 174) are shown. Adiabatic mode coupling between the first waveguide 130 and second waveguide 140 with the high-index liquid is reached.

The first curve 171 is the effective refractive index for the second waveguide 140 when the first liquid 110 covers the adiabatic coupler 180. The second curve 172 is the effective refractive index for the first waveguide 130 when the first liquid 110 covers the adiabatic coupler 180. The third curve 173 is the effective refractive index for the second waveguide 140 when the second liquid 120 covers the adiabatic coupler 180. The fourth curve 174 is the effective refractive index for the first waveguide 130 when the second liquid 120 covers the adiabatic coupler 180.

In the illustrative example of FIG. 1 adiabatic coupling will occur when the effective refractive index $n_{eff}$ curves of the fundamental modes in the respective waveguides cross (FIG. 1). This crossing happens when a high-index cladding or liquid (the second liquid 120 in the exemplary embodiment of FIG. 1) covers the coupler. This state is called the cross state of the adiabatic coupler 180. No crossing is taking place when a low-index cladding or liquid (the first liquid 110 in the exemplary embodiment of FIG. 1) is present. This state is called the bar state of the adiabatic coupler 180. It is to be noticed that in other illustrative examples the bar state can be obtained with a high-index liquid and the cross state can be obtained with a low-index liquid.

By selecting the proper states coupling can be switched on or off or can be tuned. In one of the states of the system 100, either the first state or the second state, light is coupled between the waveguides. In the other state electromagnetic waves stay within the same waveguide.

In some embodiments of the present invention the first and second waveguide 130, 140 are covered by a microfluidic channel 150 guiding liquids.

In some embodiments of the present invention, two liquids can be used that are immiscible. Aqueous alcohols combined with optical oils (known from e. g. immersion microscopy) are a possible combination of immiscible liquids. Other examples are carbonate esters or more generally esters combined with optical oils. For example the combination of a polar propylene carbonate with a non-polar polyphenyl ether (e.g. SL-5267 from SantoLubes). The polar propylene carbonate has a loss of less than 3 dB/cm. The refractive index is 1.4189 at the sodium D-line (i.e. for a wavelength of 589 nm). SL-5267 from SantoLubes has a refractive index of 1.6328 at a wavelength of 1.55 μm, and a loss of less than 0.3 dB/cm at the same 1.55 μm.

Advantageously, the system may have a long term stability even at higher temperature. In embodiments of the present invention the temperature dependency of the liquids can be small. In embodiments of the present invention the liquids should be compatible with the materials used for the system 100.

In one exemplary embodiment of the present invention the waveguides are shallowly etched (Silicon on Insulator) SOI waveguides. In case of shallowly etched waveguides in silicon on insulator, the parameter space comprises the two shallow etch depths, waveguide widths, surrounding material (oxide or not) and coupler length. A typical cross-section of the coupler 100 is given in FIGS. 3-7. A typical top view of the coupler 100 is given in FIGS. 1 and 2. The distance between the two waveguides is typically varied along the propagation direction (x-axis) so as to tune the shape of the coupling coefficient κ and the propagation constant difference Δβ. The minimum possible distance may in some embodiments be given by the used resolution during the fabrication process. Advantageously, the longer the coupler the lower the cross talk will be. Nevertheless, the latter is valid for a lossless case and therefore in practice, where there are propagation losses, an optimal length can be determined taking into account propagation losses.

Figure 2:
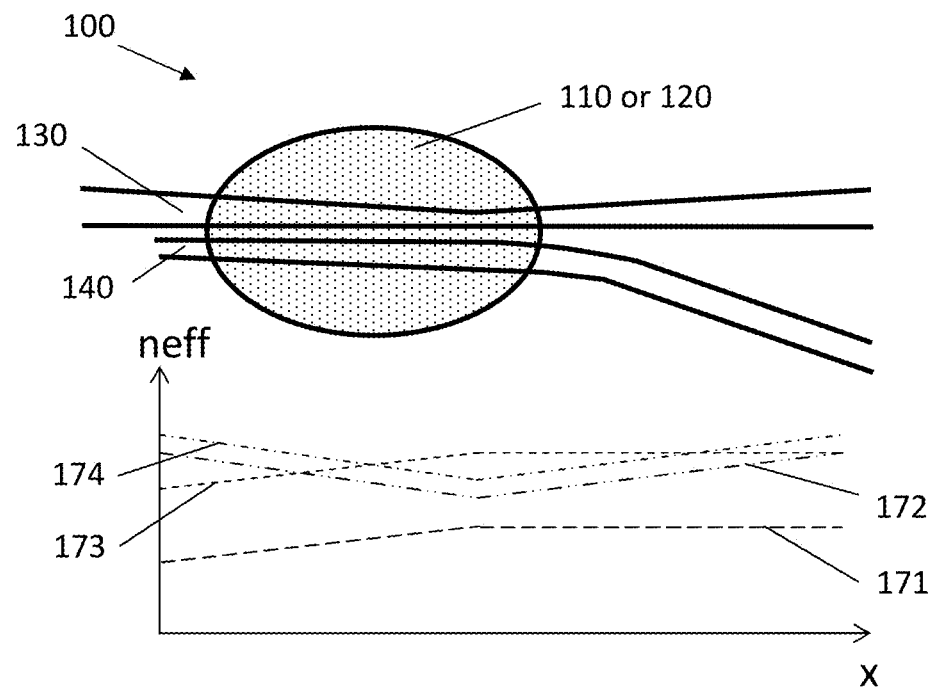
FIG. 2 illustrates a top view of a system according to an embodiment of the present invention and a graph with effective refractive indexes.

FIG. 2 is an exemplary embodiment similar to the embodiment in FIG. 1 however, instead of being contained in a microfluidic channel 150, the first liquid forms a droplet within the second liquid or vice versa. The droplet thereby covers the first and second waveguide. By moving the droplet it will be the other liquid that covers the first and second waveguide. The change in the effective refractive index when moving the droplet is illustrated in the graph of FIG. 2. The effective refractive index $n_{eff}$ as function of the x-axis along the propagation direction of the light is shown. The first curve 171 is the effective refractive index for the second waveguide 140 when the first liquid 110 covers the adiabatic coupler 180. The second curve 172 is the effective refractive index for the first waveguide 130 when the first liquid 110 covers the adiabatic coupler 180. The third curve 173 is the effective refractive index for the second waveguide 140 when the second liquid 120 covers the adiabatic coupler 180. The fourth curve 174 is the effective refractive index for the first waveguide 130 when the second liquid 120 covers the adiabatic coupler 180. In the illustrative example of FIG. 2 adiabatic coupling will occur when the effective refractive index $n_{eff}$ curves of the fundamental modes in the respective waveguides cross (FIG. 2).

In embodiments of the present invention one of the fluids can be electrostatically actuated.

Figure 3:
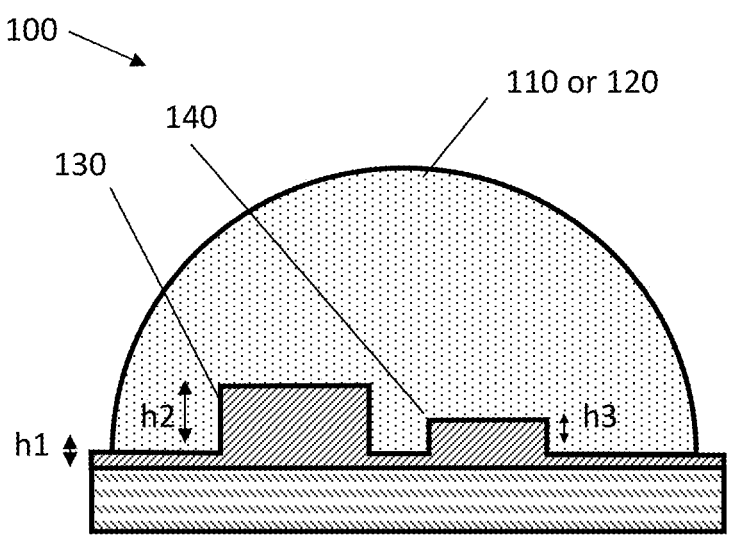
FIG. 3 to FIG. 7 illustrates cross-sections of systems according to an embodiment of the present invention.

FIG. 3 illustrates a cross-section of an exemplary embodiment of the present invention. The first or second liquid 110, 120 is covering the first and second waveguide 130, 140. The cross-section of the first waveguide 130 is different from the cross-section of the second waveguide 140 in both height and width.

Figure 4:
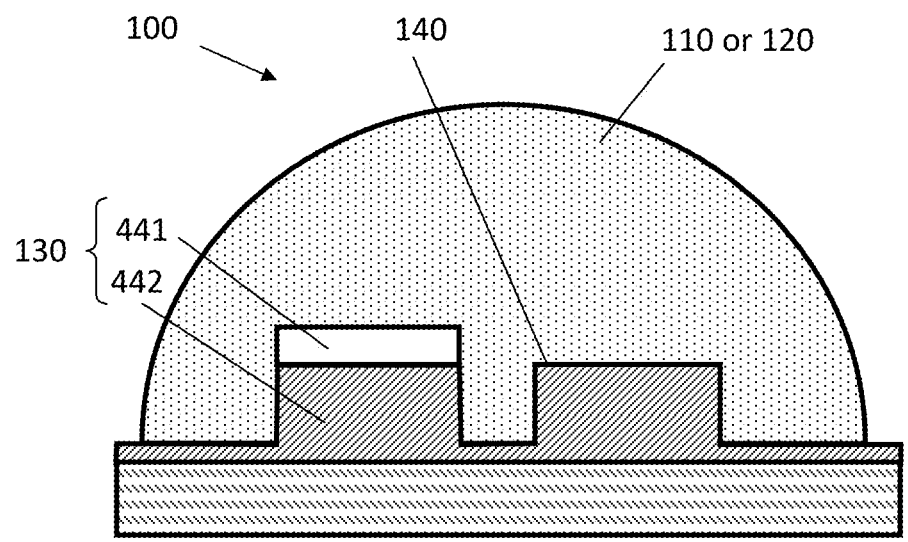

FIG. 4 illustrates an exemplary embodiment of the current invention wherein the difference in cross-section between the two waveguides is the cladding 441 in the second waveguide 140.

Figure 5:
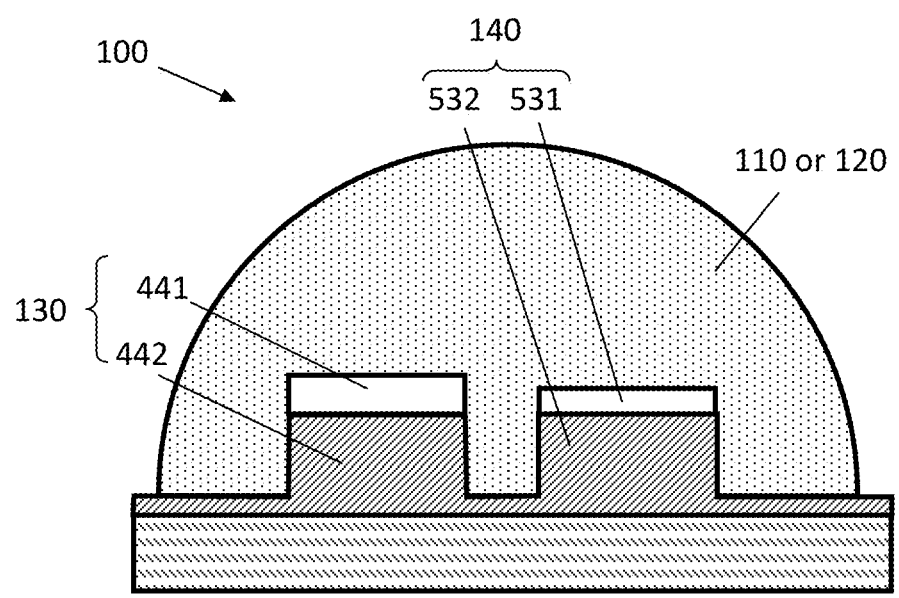

In the illustrative embodiment of FIG. 5 the first waveguide 130 comprises a core 532 and a cladding 531 and the second waveguide 140 comprises a core 442 and a cladding 441. The difference in interaction with the environment between both waveguides can be made in the cross-section, e.g. the core-cladding geometry, the material choice of the cladding, the distance to the top surface of the system, . . . .

Figure 6:
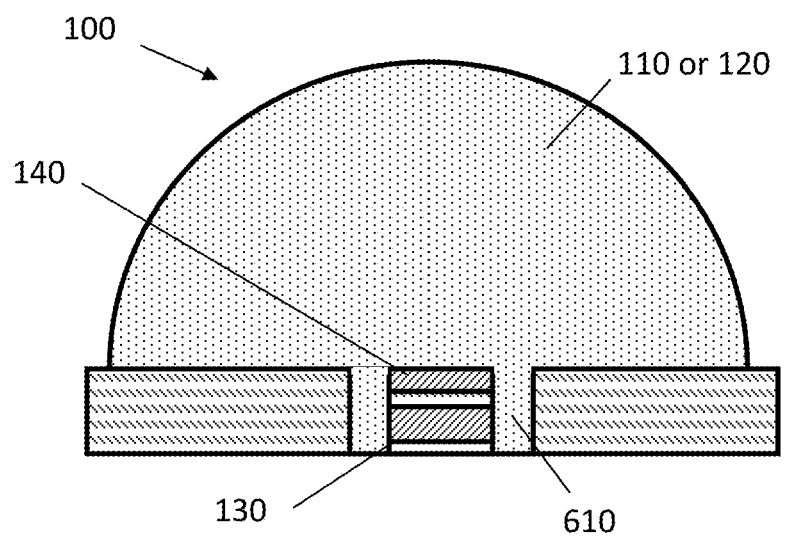

In the illustrative embodiment of FIG. 6 both waveguides 130, 140 are stacked on top of each other, and a cavity 610 surrounds both waveguides. The cavity contains either the first or second liquid 110, 120. The surface normal cross-section of the first waveguide 130 is different from the cross-section of the second waveguide 140. Indeed, when e.g. considering the undercladding of waveguide 1, and considering the undercladding of waveguide 2, the undercladdings are different, resulting in a different surface normal cross-section for waveguide 1 and waveguide 2. (Also the uppercladdings are different for both waveguides) The adiabatic coupler 180 is either in the bar state or cross state depending on which one of both liquids the cavity 610 contains.

In embodiments of the present invention a cavity 610 is present in between or completely or partly surrounding the first and second waveguide 120, 130. In embodiments of the current invention this cavity can be filled with a first liquid which can be replaced with a second liquid. Replacing of the first liquid with the second liquid can be done through an electro wetting on dielectric (EWOD) process. In embodiments of the current invention the first liquid is present as droplets within the second liquid. By moving a droplet from outside to within a cavity 110 between or (partly) surrounding the first and second waveguide 110,120 the second liquid is replaced with the first liquid and vice versa.

In embodiments of the current invention the cavity 110 is a microfluidic channel in between or completely or partly surrounding the first and second waveguide. In embodiments of the current invention the first and second liquid can be moved within the microfluidic channel.

Figure 7:
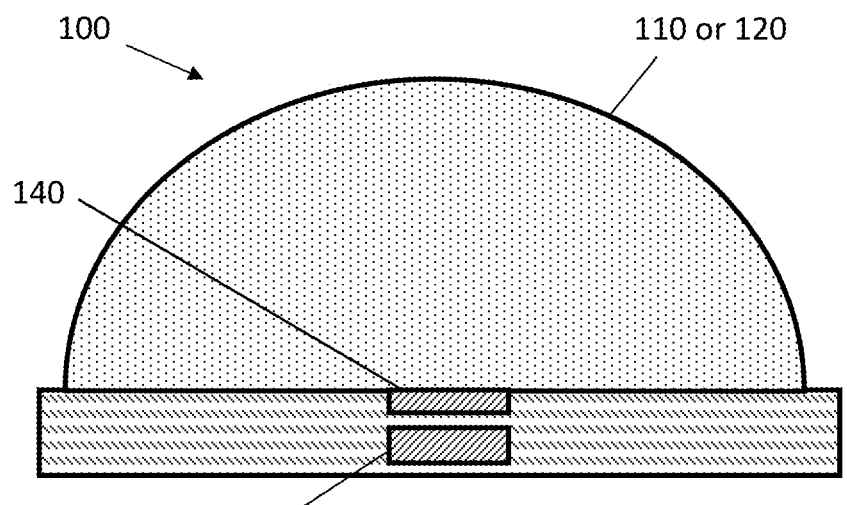

In the illustrative embodiment of FIG. 7 the first Si or SiN waveguide 130 is completely embedded in e.g. $SiO_2$, e.g. a polymer layer or e.g. another dielectric layer with lower refractive index than the waveguide. Most polymers can be used as a cladding material as long as they are chemically compatible with the used liquids. One particular example is SU-8 with a refractive index of 1.575 at 1550 nm. The cross-section of the first waveguide 130 is different from the cross-section of the second waveguide 140. The second waveguide 140 is covered by either the first or second liquid 110 or 120. By changing the liquid the system 100 changes from the bar state to the cross state.

Figure 8:
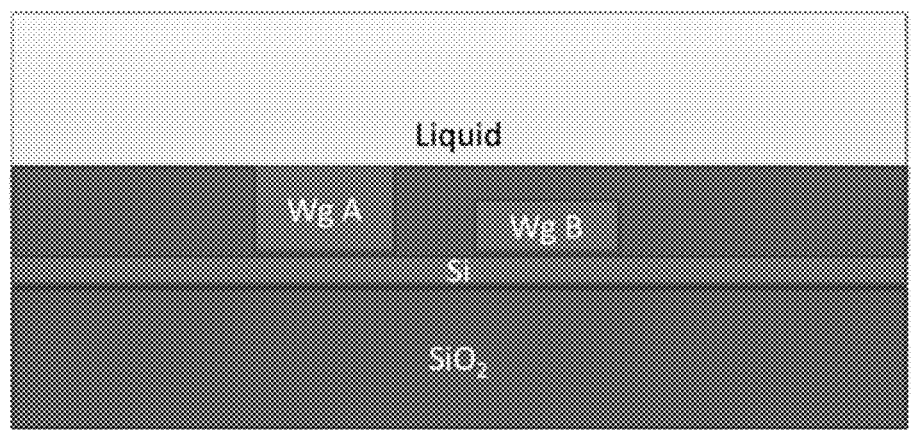
FIG. 8 to FIG. 10 illustrates cross-sections of further examples of systems according to embodiments of the present invention.
Figure 9:
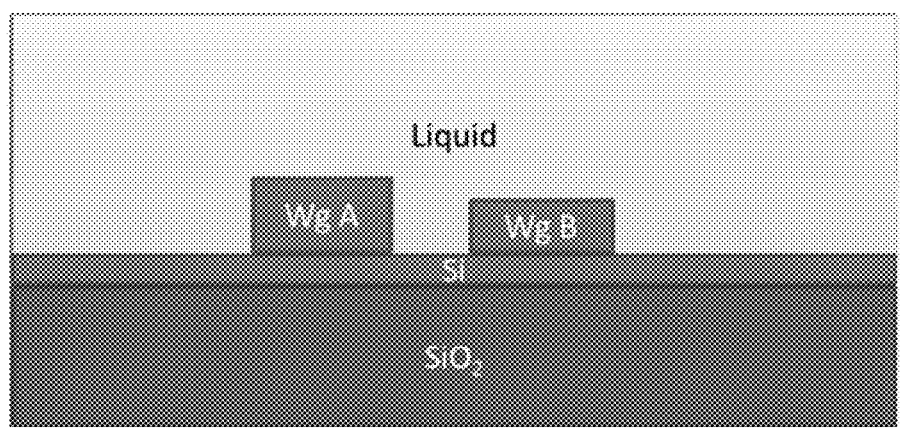
Figure 10:
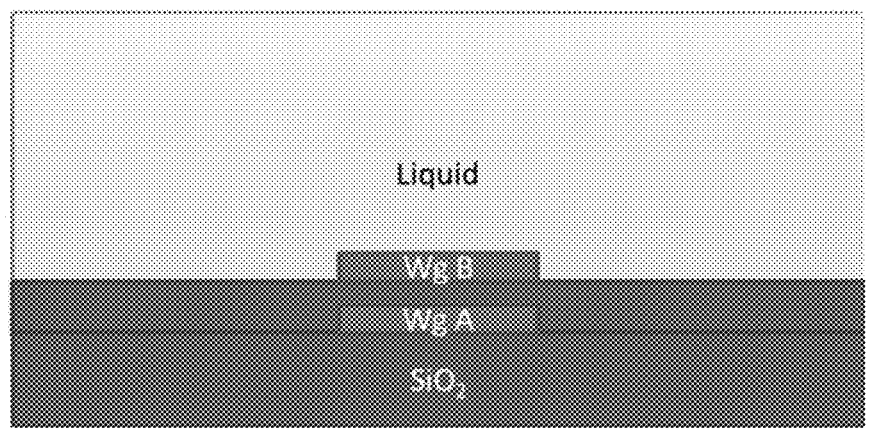

By way of illustration a number of additional examples of a system according to embodiments of the present invention are shown in FIGS. 8 to 10. FIG. 8 thereby illustrates a design as shown in FIG. 3, whereby a difference in height occurs for both waveguides. As the fluid may overlay both waveguides, no particular etching steps are required for limiting the fluid and the system also does not suffer from alignment problems in that respect. The waveguides with different heights are embedded in a solid layer. In FIG. 9, a similar situation as in FIG. 8 is shown, but the waveguides are not embedded in a layer, e.g. in the $SiO_2$ layer. Although it provides some additional freedom in design, the liquid may get stuck between the waveguides and there may be a lower figure of merit because both waveguides feel the fluid directly. In FIG. 10 a stacked system is shown, whereby waveguide B has a high modal overlap with the liquid, thus providing good tuning possibilities.

Further by way of illustration, embodiments of the present invention not being limited thereby, some principles of embodiments of the present invention could be explained based on theoretical considerations. To achieve adiabatic coupling, the coupling coefficient κ and the propagation constant difference $\Delta\beta$ ($=2\pi\Delta n/\lambda$ with n the effective refractive index of the waveguides and λ the wavelength) between the constituent waveguide modes should vary along a prescribed path in function of the propagation distance x. From the theory around adiabatic couplers as e.g. described in Hsioa, Hsien-kai, "Active integrated optic device for sensing optical rate gyroscopes and stellar interferometers", PhD Thesis, Michigan: University of Michigan, 2010 and Ishikawa, Hiroshi "Fully adiabatic design of waveguide branches", Journal of Lightwave Technology 25, no 7 (July 2007): pp 1832-1840, it is clear that the needed coupler length is lowered for a certain envisioned cross talk in the cross state when the maximum value for $\Delta\beta$ (found at the adiabatic tapers 190) and maximum value for κ (found in the coupling section 180, preferably at the point where $\Delta\beta=0$ in the cross state) are increased. It is also clear from literature that a preferred ratio exists between the maximum value for $\Delta\beta$ and maximum value for κ. In embodiments of the present invention the path of $\Delta\beta$ and κ may be as follows:

$$\kappa(z) = \kappa_{max} \sin(t(z))$$

$$\Delta\beta(z) = \Delta\beta_{max} \cos(t(z))$$

with t(z) a function ranging from 0 to π. From literature it is clear that a Blackman function is preferred in comparison with a linear, weighted, raised cosine and Hamming function. In embodiments of the present invention t(z) is the Blackman function and the ratio $M=\kappa_{max}/\Delta\beta_{max}$ is equal to 0.5 or preferentially larger than 0.4. The cross talk, defined as the optical power found in the first waveguide being coupled from the second waveguide or the power found in the second waveguide being coupled from the first waveguide, should be as small as possible in optical couplers. It can be shown that the cross talk is primarily a function of the exact profiles of $\Delta\beta(z)$ and $\kappa(z)$. In embodiments of the present invention this profile may be already defined above with t(z) the Blackman function and the cross talk is therefore primarily a function of $\kappa_{max}$ and $\Delta\beta_{max}$, or solely $\kappa_{max}$ or $\Delta\beta_{max}$ when a ratio M between these two values is defined as well.

To achieve the prescribed paths for $\Delta\beta(z)$ and $\kappa(z)$ the waveguide widths and distance between them (be it horizontal spacing in the horizontal configuration or horizontal offset in the vertical configuration) are varied along the propagation direction.

As cross talk lowers and total absorption increases with the coupler length, an optimal length exists where total coupler losses (total absorption+cross talk) are minimal for a given wavelength.

Figure 11:
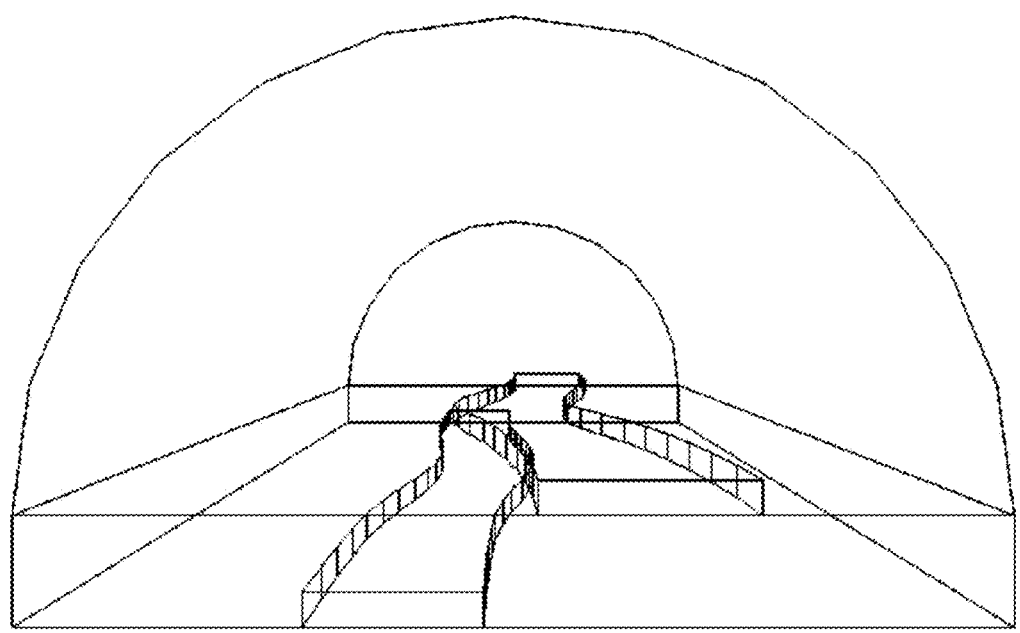
FIG. 11 illustrates a schematic three dimensional representation of a system according to an embodiment of the present invention.

In FIG. 11 a schematic three dimensional view is shown of a system according to an embodiment of the present invention.

In a second aspect, the present invention relates to a method for selectively adiabatically coupling electromagnetic waves from a first waveguide to a second waveguide. The method may be especially suitable for switching using a system as described in the first aspect, although embodiments are not limited thereto. According to embodiments of the present invention, the method comprises selectively positioning a first fluid for simultaneously overlaying both a waveguide portion of the first waveguide and a waveguide portion of the second waveguide in a coupling region where the waveguide portions have a substantially different geometry and/or distance to a top surface of the system and are positioned so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur. In the method, the selectively positioning thereby is such that it is selectively inducing first predetermined environmental conditions or second predetermined environmental conditions. During the method, the fluid which is covering both waveguides is changed with the other fluid. By doing so the state of the system changes from cross state to bar state or vice versa.

In a third aspect, the present invention relates to a method of manufacturing a system for selectively adiabatically coupling electromagnetic waves from a first waveguide to a second waveguide. The manufacturing technique comprises providing a first waveguide portion and a second waveguide portion whereby the first waveguide portion and the second waveguide portion have a substantially different geometry and/or distance to a top surface of the system and are positioned in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur. The manufacturing technique also comprises providing a fluid positioning means for selectively positioning a first fluid simultaneously overlaying both said first waveguide portion and said second waveguide portion in the coupling region thus selectively inducing first predetermined environmental conditions or second predetermined environmental conditions. The method advantageously may comprise using CMOS processing techniques. The method also may comprise providing the waveguide portions according to a design as provided in systems according to the first aspect.

In a fourth aspect, the present invention relates to a system for selectively adiabatically coupling electromagnetic waves from one waveguide to another waveguide. According to embodiments of the present aspect, the system comprises a first waveguide portion and a second waveguide portion. The first waveguide portion and the second waveguide portion are being stacked vertically on top of each other and are being positioned with respect to each other in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur. The system also comprises a fluid positioning means for selectively positioning a first fluid with respect to said first waveguide portion and said second waveguide portion in the coupling region for selectively inducing first predetermined environmental conditions or second predetermined environmental conditions. The system also may, mutates mutandis, comprise features as described in the first aspect. The present invention, in one aspect, also relates to a method of manufacturing such a system. An advantage thereof is that providing vertical stacked waveguides can accurately be performed.

By way of illustration, embodiments of the present invention not being limited thereto, features and advantages of some embodiments will be illustrated below. Experimental results are described illustrating the operation of the adiabatic coupler.

Figure 12:
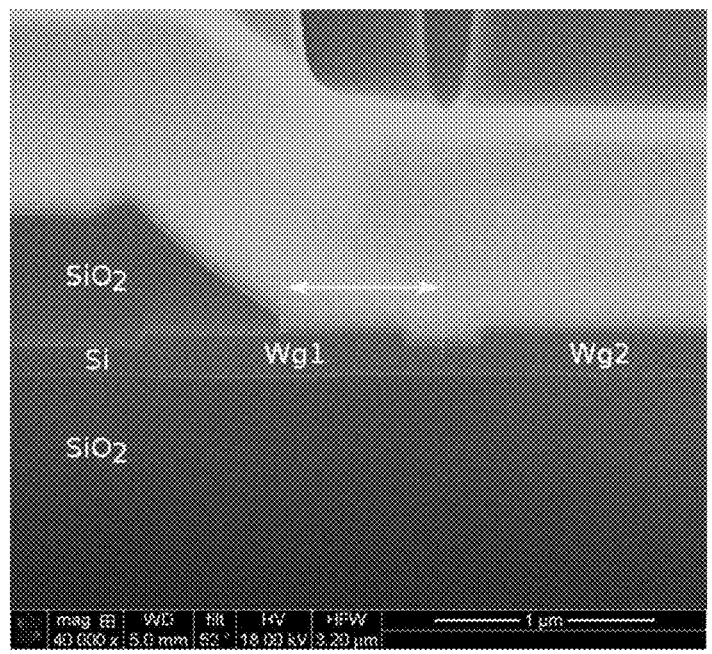
FIG. 12 illustrates a SEM image of a cross section of a switch with indication of the 2 waveguides (Wg1 and Wg2) and the misalignment of the oxide slope, for an exemplary coupler according to an embodiment of the present invention.
Figure 15:
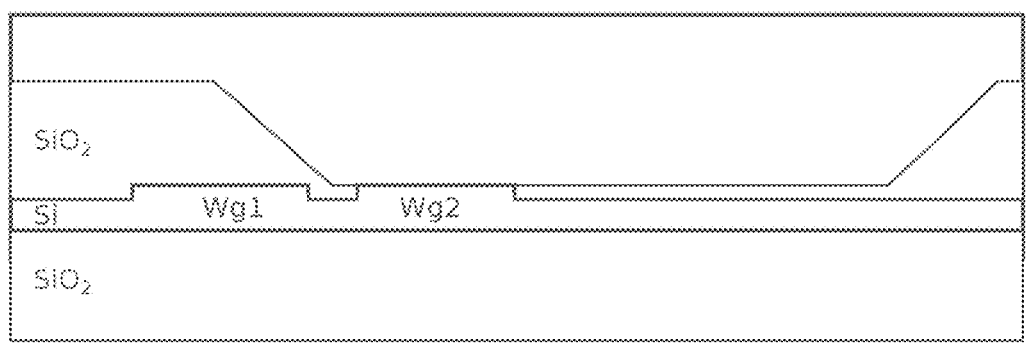
FIG. 15 illustrates an exemplary coupler according to an embodiment of the present invention as used for obtaining experimental results as shown in FIG. 13 and FIG. 14.

In the experiment, a 2×2 adiabatic switching element (SE) has been fabricated and characterized. A SEM picture of the cross section of a SE is shown in FIG. 12. For the fabrication 200 mm SOI wafers were used with 220 nm Si and 2 µm buried oxide. The coupler consisted of rib waveguides with a partial etch of 70 nm. The SOI chip was covered by 800 nm $SiO_2$ using plasma enhanced chemical vapor deposition. After patterning a photoresist window by optical lithography, the deposited $SiO_2$ was etched using buffered oxide etching. The angle of the obtained oxide slope was 45°. The misalignment of the oxide slope of the coupler in FIG. 12 was 740 nm (indicated by arrow). Current smallest achieved misalignment was 340 nm. A schematic representation of the structure is shown in FIG. 15

The switch is characterized for the two states (bar and cross state). The first tests were done by filling a reservoir on top of the chip with one of the liquids. After characterization the liquid was removed, the chip was cleaned, and a liquid with a different refractive index was applied. Standard refractive index matching liquids from the company Cargille were used for the characterization.

Figure 13:
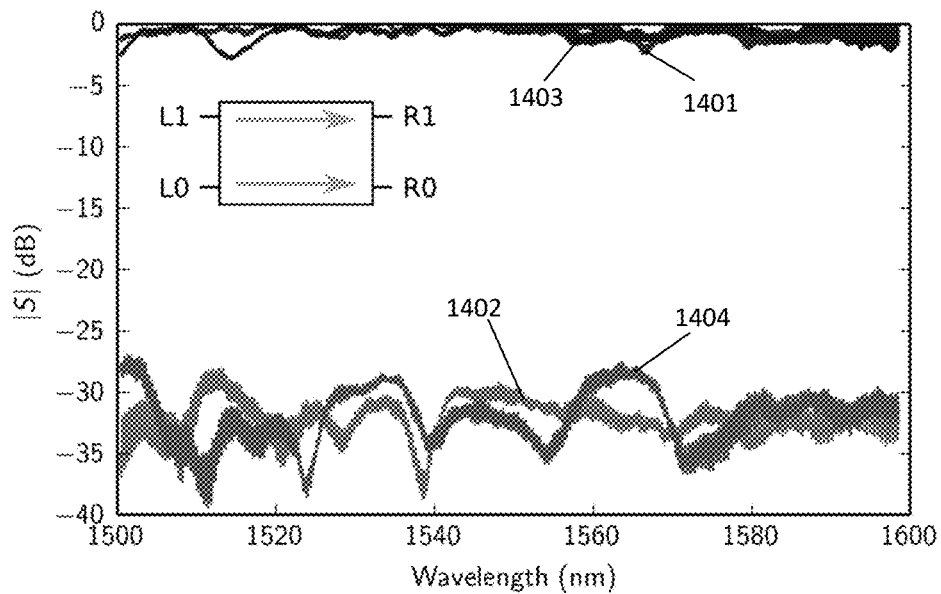
FIG. 13 illustrates the transmission of an exemplary coupler in bar state ($n_{liquid}$=1.42) according to an embodiment of the present invention.
Figure 14:
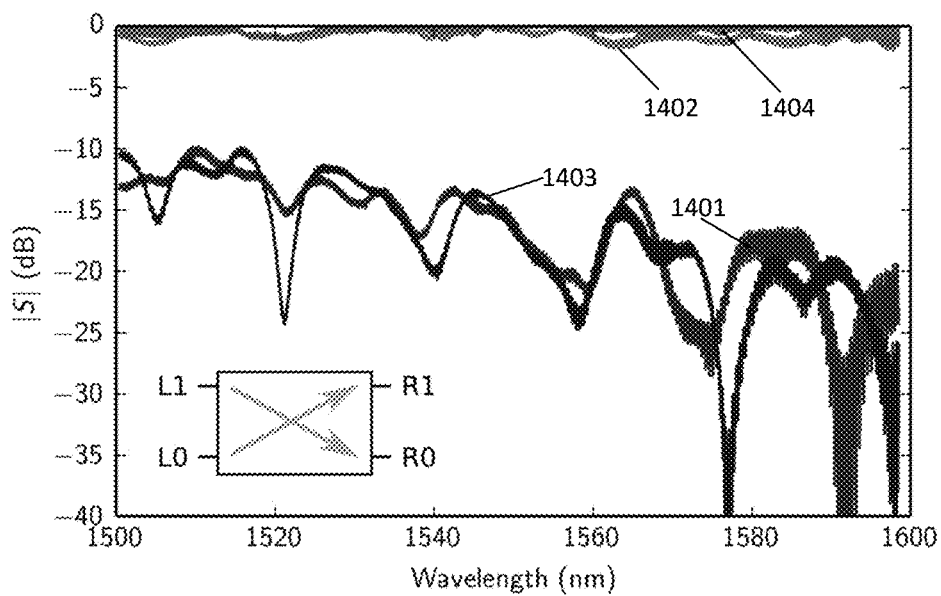
FIG. 14 illustrates the transmission of an exemplary coupler in cross state ($n_{liquid}$=1.67) according to an embodiment of the present invention.

The measurement results were shown in FIGS. 13 and 14. The results are for the switch with best achieved alignment. The input polarization was TE. In FIG. 13 the switch is in bar state with a low index liquid (n=1.42) on top, as indicated by the inset. The losses between the different ports, defined as L0 and R0 for the left side and right side respectively of the first channel and L1 and R1 for the left side and right side respectively of the second channel, are shown. Curve 1401 shows the loss curve $S_{L0,R0}$ between ports L0 and R0, curve 1402 shows the loss curve $S_{L0,R1}$ between ports L0 and R1, curve 1403 shows the loss curve $S_{L1,R1}$ between ports L1 and R1 and curve 1404 shows the loss curve $S_{L1,R0}$ between ports L1 and R0. The isolation was higher than 25 dB from 1500 nm to 1600 nm. In FIG. 14 the switch is in cross state with a high index liquid (n=1.67) on top. The isolation is higher than 10 dB from 1500 to 1600 nm. For the cross and bar state the port-to-port insertion loss is lower than 3 dB.

The experimental results were realized with an exemplary broadband switch, which could further be significantly optimized. Optimisation is for example possible in the fabrication. Current most important shortcomings in fabrication are misalignment, non-flat oxide slope, roughness of oxide slope, and over-etch of the deposited oxide. Second, the waveguide geometry is not optimized. Third, the switch was designed for the refractive indices 1.42 and 1.63. A larger difference in refractive index would result in improved performance. It is expected that a liquid-gas system would result in a significant improved performance (XT, IL, length). Together with an optimized cross section and an improved fabrication the coupler could be significantly improved overall. The possibility that both fundamental waveguide polarizations can be supported is not excluded.

The above experimental results demonstrate an adiabatic switch according to an embodiment of the present invention and it switching state operation by applying liquids with a different refractive index on top of the chip. Although the switch has not been optimized, the switch shows broadband operation. Improved performance further can be realized by an improved fabrication, an optimized waveguide cross section and a higher index difference of the liquids. The measurement results show a switching behavior with an overall isolation better than 10 dB over a wavelength range of 100 nm.

The invention claimed is:

1. A system for selectively adiabatically coupling electromagnetic waves from one waveguide to another waveguide, the system comprising:
    a first waveguide portion and a second waveguide portion, the first waveguide portion and the second waveguide portion having a substantially different surface normal cross-section causing a different interaction of the first and second waveguides with the environment, and the first waveguide portion and the second waveguide portion being positioned with respect to each other in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur; and
    a fluid positioning means for selectively positioning at least a first fluid such that it is selectively either simultaneously overlaying both said first waveguide portion and said second waveguide portion in the coupling region thus inducing first predetermined environmental conditions or not overlaying both said first waveguide portion and said second waveguide portion in the coupling region thus inducing second predetermined environmental conditions.

2. A system according to claim 1, wherein the fluid positioning means for selectively positioning a first fluid comprises a first fluid having a first refractive index and a second fluid having a second refractive index, different from the first refractive index, and wherein the fluid positioning means is configured for replacing the first fluid by the second fluid in the coupling region.

3. A system according to claim 1, wherein the fluid positioning means comprises a microfluidic channel or compartment and is adapted for moving at least the first fluid therein.

4. A system according to claim 3, wherein the microfluidic channel overlays the coupling region.

5. A system according to claim 1, wherein the cross-section of the first waveguide in the coupling region has a different shape than the cross-section of the second waveguide in the coupling region.

6. A system according to claim 1, wherein the distance between the core of the waveguide and the first fluid is different for the second waveguide compared to the first waveguide.

7. A system according to claim 6, wherein the first waveguide comprises a cladding in the coupling region whereas the second waveguide does not comprise a cladding in the coupling region or wherein a cladding of the first waveguide and a cladding of the second waveguide are different in size and/or geometry, or wherein a cladding of the first waveguide and a cladding of the second waveguide are made of different materials, or wherein the first and second waveguide are stacked vertically and liquid is filling cavity in between waveguides, or wherein the first and second waveguide are stacked vertically and liquid is surrounding at least partially at least one of the waveguides.

8. A system according to claim 2, wherein the first fluid has a high refractive index and wherein the second liquid has a low refractive index and/or wherein the first fluid and the second fluid are immiscible.

9. A system according to claim 1, wherein the fluids can be moved through electro wetting on dielectric.

10. A system according to claim 1, wherein the first waveguide and the second waveguide are positioned horizontally aside each other.

11. A system according to claim 1, the system being implemented based on a silicon platform.

12. A method for selectively adiabatically coupling electromagnetic waves from a first waveguide to a second waveguide, the method comprising
    selectively positioning a first fluid for simultaneously overlaying both a waveguide portion of the first waveguide and a waveguide portion of the second waveguide in a coupling region or for not overlaying both said first waveguide portion and said second waveguide portion in the coupling region, where the waveguide portions have a substantially different surface normal cross-section causing a different interaction of the first and second waveguides with the environment and are positioned so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur, the selectively positioning being such to selectively inducing first predetermined environmental conditions or second predetermined environmental conditions.

13. A method of manufacturing a system for selectively adiabatically coupling electromagnetic waves from a first waveguide to a second waveguide, the method comprising:
    providing a first waveguide and a second waveguide, the first waveguide portion and the second waveguide portion having a substantially different geometry and/or distance to a top surface of the system causing a different interaction of the first and second waveguides with the environment and being positioned in a coupling region so that under first predetermined environmental conditions coupling of electromagnetic waves between the first waveguide portion and the second waveguide portion can occur and under second predetermined environmental conditions substantially no coupling of electromagnetic waves between the first waveguide portion and the second waveguide portion can occur; and providing a fluid positioning means for selectively positioning a first fluid simultaneously overlaying both said first waveguide portion and said second waveguide portion in the coupling region thus selectively inducing first predetermined environmental conditions or for not overlaying both said first waveguide portion and said second waveguide portion in the coupling region thus inducing second predetermined environmental conditions.

14. A method according to claim 13, wherein providing said waveguides comprises using CMOS processing techniques.

15. A method according to claim 13, wherein providing said waveguides comprises providing a cladding material on one waveguide, while providing no cladding material on the other waveguide.

* * * * *